United States Patent
Axelrod et al.

(10) Patent No.: US 8,627,787 B2
(45) Date of Patent: Jan. 14, 2014

(54) DURABLE BONE WITH SOFT CORE

(75) Inventors: Glen S. Axelrod, Colts Neck, NJ (US); Ajay Gajria, Maharashtra (IN)

(73) Assignee: T.F.H. Publications, Inc., Neptune City, NJ (US)

( * ) Notice: Subject to any disclaimer, the term of this patent is extended or adjusted under 35 U.S.C. 154(b) by 0 days.

(21) Appl. No.: 13/127,626

(22) PCT Filed: Oct. 6, 2009

(86) PCT No.: PCT/US2009/059668
§ 371 (c)(1),
(2), (4) Date: Aug. 29, 2011

(87) PCT Pub. No.: WO2010/042495
PCT Pub. Date: Apr. 15, 2010

(65) Prior Publication Data
US 2011/0303160 A1 Dec. 15, 2011

(51) Int. Cl.
*A01K 29/00* (2006.01)
(52) U.S. Cl.
USPC .......................................... 119/709; 119/707
(58) Field of Classification Search
USPC ......... 119/709, 702, 707, 708, 710, 711, 174;
D30/160; 426/623, 512, 514, 516;
156/228, 242, 245, 308.4; 264/250
See application file for complete search history.

(56) References Cited

U.S. PATENT DOCUMENTS

| | | | |
|---|---|---|---|
| 6,067,941 A | 5/2000 | Axelrod | |
| 6,112,703 A | 9/2000 | Handelsman | |
| 6,186,348 B1 | 2/2001 | Rouoet | |
| 6,202,598 B1 | 3/2001 | Willinger | |
| 6,283,063 B1 | 9/2001 | Zalevsky | |
| 6,474,268 B1 | 11/2002 | Suchowski et al. | |
| 7,017,523 B2 | 3/2006 | Handelsman | |
| 7,063,044 B2 | 6/2006 | Handelsman et al. | |
| 7,270,085 B2 | 9/2007 | Wolfe, Jr. et al. | |
| 7,343,878 B2 | 3/2008 | Ritchey et al. | |
| 7,490,579 B2 | 2/2009 | Axelrod | |
| 2007/0212456 A1 | 9/2007 | Axelrod | |
| 2007/0264415 A1 | 11/2007 | Axelrod et al. | |

OTHER PUBLICATIONS

International Search Report and Written Opinion from corresponding PCT Application No. PCT/US2009/059668 dated Dec. 2, 2009.

*Primary Examiner* — T. Nguyen
(74) *Attorney, Agent, or Firm* — Grossman, Tucker, Perreault & Pfleger, PLLC

(57) ABSTRACT

The present invention, in one exemplary embodiment, relates a method of manufacturing an animal chew by molding two body portions of a first material each having at least one concave surface and one or more through holes, attaching the two portions together such that the concave surfaces face one another to form a hollow body portion, injecting a second material into the hollow body portion to fill at least a portion of the hollow body and form areas of exposed regions of the second material by filling the one or more through holes. In a second exemplary embodiment, the two portions may have the concave surfaces over-molded with a second material which fills the one or more through holes. In a third exemplary embodiment, a separate shape of a second material may be molded in a configuration having dimensions complementary to the two half portion and holes when the portions are combined.

11 Claims, 7 Drawing Sheets

100

Injection mold two concave halves of a first material, the halves including through holes

200

Weld the two concave halves together to form a hollow body

300

Inject a second material into the hollow body such that the second material forms exposed regions in the surface of the hollow body

Injection mold
two concave
halves of a first
material, the
halves including
through holes

200

Over-mold each
concave portion
with a second
material, filling
the holes

Weld the two
overmolded
halves together
to form an
animal chew

100

Injection mold two concave halves of a first material, the halve including through holes

200

Mold a second configuration of a second material having a shape complimenting the combined concave surfaces and holes of the first material

300

Weld the two concave halves together, surrounding the second configuration and filling the holes to form exposed regions

FIG. 8

DURABLE BONE WITH SOFT CORE

CROSS REFERENCE TO RELATED APPLICATIONS

This Application claims priority to International PCT Application No. PCT/US2009/59668 filed Oct. 6, 2009, which claims priority to U.S. patent application Ser. No. 12/246,846 filed on Oct. 7, 2008, the content of which are fully incorporated herein by reference.

FIELD

The present invention relates to an animal chew having a body portion of a first material and a core of a second material which may have different properties than the first material, wherein the body portion has exposed regions of the second material. In particular, the present invention relates to methods of forming a body portion and joining a core portion to the body portion, in one exemplary embodiment, using tapered holes.

BACKGROUND

Most dogs enjoy chewing on things, although preferences vary as to the hardness of the substances favored. Some dogs like to chew on very hard materials such as cow bones, wood and nylon, while others prefer softer chews such as polyurethane or rubber. Still others favor freeze dried snacks. Some dogs due to their age may not be able to chew on very hard substances. Young dogs may have insufficiently developed teeth, while old dogs may have diseased gums or may have lost some of their teeth.

Furthermore, chew toys may be used as a vehicle to provide interaction between dogs and people. For example, some people like to play fetch with dogs using sticks, balls, flying disks, etc. Other people like to play "tug-of-war" with their animals, using ropes, sticks, etc. The interaction between pets and their owners has reportedly been found to be not only beneficial to the pet, as it provides the pet with necessary exercise and companionship, but beneficial to their owners as well, with many reported health related benefits.

Accordingly, the prior art is replete with disclosures directed at forming a variety of chew toys. However, there is still a need to provide chew toys that fulfill other requirements. For example, it may also be useful to provide pet chews that are interesting not only to pets, but to the pet owners as well. Additionally, it may also be useful to provide pet chews that enhance the feel of the chew to the pet or owner. Accordingly, a pet toy of novel construction may be directed to sparking the interest of, not only the pet, but children, teenage or adult owners, which may increase the time period that owners engage with their animals.

More particularly, it may be preferred that chew toys have a reasonable durability and maintain the interest of the animal for more than one interaction. Further, it may be preferred that such chew toys comprise more than one material such that a variety of chewing experiences may be provided for the pet. Towards that end, if different materials having different physical properties, such as hardness or different attractant properties, can be combined into a single chew, the pet may prefer one of the materials over the other and remain interested for a longer time period while attempting to dislodge such. Accordingly, it may be desirable that means be provided to retain such preferred materials from easily being dislodged or removed from the body of the chew. In addition, the body of the chew may include a series of ridges or protrusions that may interact with the teeth of the pet to provide a massaging and/or cleaning action. Such protrusions may comprise exposed regions of a second material which protrude through tapered holes in the body of a first material and may be in the form of indicia, etc.

SUMMARY

An aspect of the present invention relates to an animal chew having hard and soft exposed regions comprising a hollow body portion of a first material having a first hardness and a core of a second material having a second hardness, wherein the body portion includes one or more exposed regions of the second material having a second hardness, the exposed regions at least partially occupying one or more through holes in the body portion.

Another aspect of the present invention relates to a method of manufacturing an animal chew comprising providing a first material, molding the first material into the shape of two body portions each half having a concave surface, and at least one of the half body portions including one or more through holes. This may be followed by attaching the two body portions together such that the concave surfaces face one another to form a hollow body portion. This may be followed by providing a second material, placing the hollow body into a second mold and injecting the second material into the hollow body to at least partially fill the hollow body and the one or more through holes such that a portion of the second material remains exposed.

A further aspect of the present invention relates to a method of manufacturing an animal chew comprising providing a first material, molding said first material into the shape of two body portions each portion having a concave surface, and at least one of said body portions including one or more through holes. This may be followed by providing a second material, placing each of the body portions in a second mold and over-molding the concave surface and filling the one or more through holes with the second material such that a portion of the second material remains exposed. This may be followed by attaching the two over-molded body portions together such that the concave surfaces face one another to form a hollow animal chew.

A further aspect of the present invention relates to a method of manufacturing an animal chew comprising providing a first material, molding the first material into the shape of two body portions each half having a concave surface, and at least one of said body portions including one or more through holes. This may be followed by providing a second material, molding the second material into a configuration having surface dimensions that complement the dimensions of the concave surfaces of the portions when the portions are combined. The second material may include protrusions that may extend through one or more through holes of at least one of the body portion. This may then be followed by attaching the two half body portions together such that said concave surfaces may face each other and surround at least a portion of the molded configuration of the second material and fill at least one or more through holes.

In a related aspect of the present invention, a separate molding of a second or third material may be applied in the area of the joint line between half body portions to cover the joint line and/or to attach the two half body portions together.

BRIEF DESCRIPTION OF THE DRAWINGS

The detailed description below may be better understood with reference to the accompanying figures which are pro

FIG. 6 is a process flow diagram of the schematic shown in FIG. 1;

FIG. 7 is a process flow diagram of the schematic shown in FIG. 2;

FIG. 8 is a process flow diagram of the schematic shown in FIG. 4.

DETAILED DESCRIPTION

The present invention relates to an animal chew or bone that provides a body portion of a first material and a second material located within the body portion and exposed or protruding from holes formed in the body portion, the first and second materials may differ in one or more properties, such as hardness, durability, flexibility, etc. The holes may be tapered to form an undercut or die-locked condition to aid in retaining the second material within the body of the first material.

Figure 1:
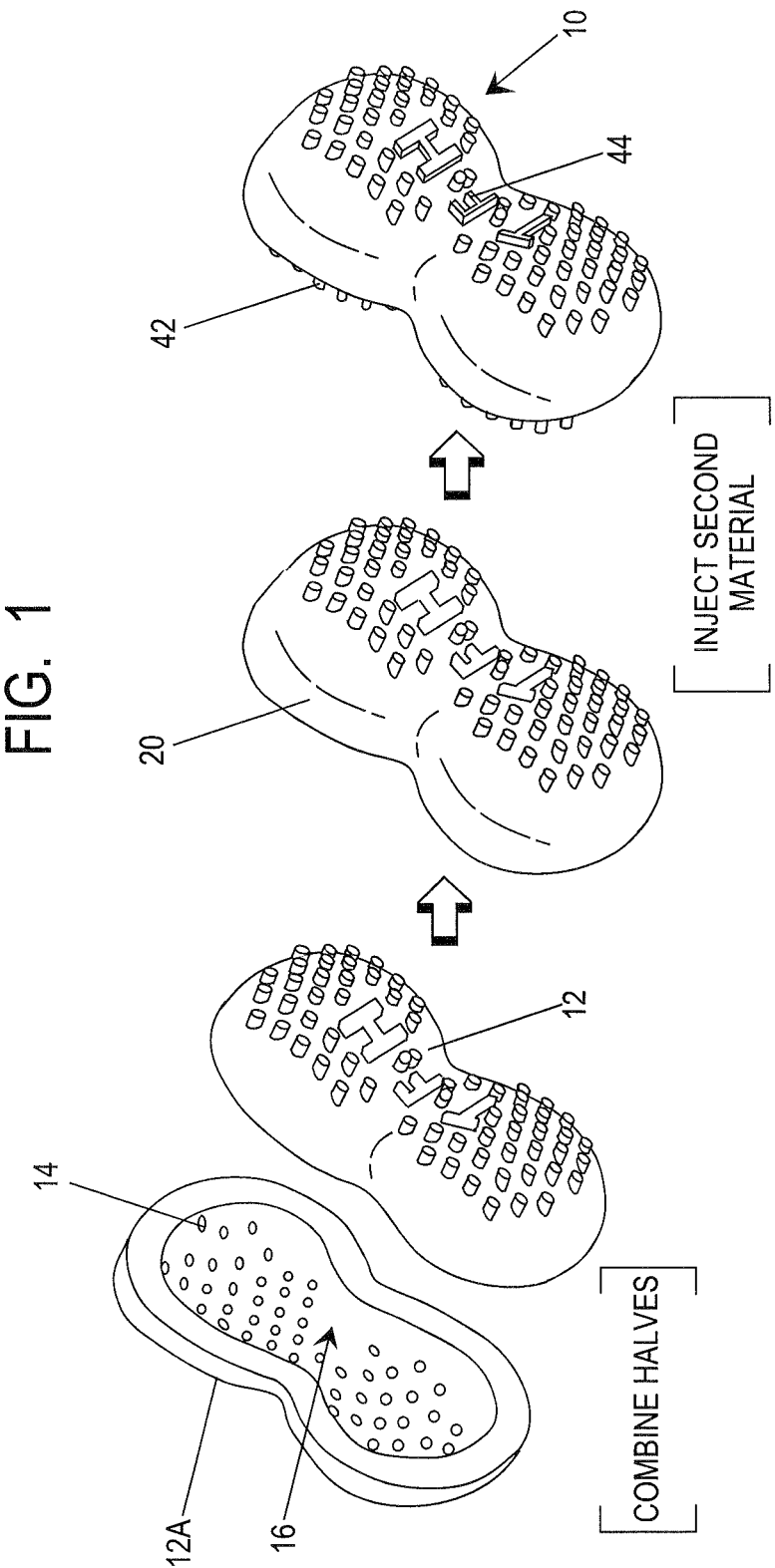
- FIG. 1 is a process flow schematic illustrating a first method for forming the animal chew of the present invention.

In an exemplary embodiment, as illustrated in FIG. 1, an animal chew or bone 10 may be formed as follows:

a) molding two half body portions 12,12A of a first material having at least one concave surface 16 and one or more through holes 14, (see Block 100 in FIG. 6);

b) attaching the two half portions together [combine halves] such that the concave surfaces 16 face one another to form a hollow body portion 20, (see Block 200 in FIG. 6);

c) injecting a second material into the hollow body portion 20 to form areas of exposed regions of the second material, as for instance protrusions 42 and/or indicia 44 by filling the one or more through holes 14, (see Block 300 in FIG. 6) and d) allowing the molded chew to cool and demolding such.

In step a) the half body portions may be molded using any of the methods of melt processing plastic or plastic-like materials known in the art, particularly those disclosed herein, such as but not limited to, injection molding, compression molding, blow molding, transfer molding, etc. In addition, it is further contemplated that the first and second materials may comprise thermosetting polymers, natural or synthetic rubber or edible compositions as disclosed herein. The two half portions may be joined by any of the attachment processes known in the art, such as, but not limited to, mechanical, adhesive, or plastic welding processes such as laser, ultrasonic, vibration, induction, hot plate conduction, electromagnetic radiation, microwave radiation, radio frequency welding or heat staking. In addition, the half body portion 12 may also include a plurality of protrusions extending from the outer surface and formed of the first material. These protrusions may form a pattern or message, logo, etc.

In step c), the hollow body portion may be placed into a second mold and a second material composition, differing in some property from the first material, may be injected and solidified to fill out the hollow body portion and fill the one or more through holes formed in the body portion. The second material may form exposed regions of that material which are flush with or may protrude from the surface of the body portion. The through holes and or the protrusions may have a profile which is, for instance, round, square, triangular, rectangular, hexagonal, star-shaped, ribbed, etc. The exposed regions may be in the form of ribs, plugs, logos, indicia, etc.

In an exemplary embodiment, the body portion 20 was formed of a polyamide of a first hardness and the core material which formed exposed regions 42, 44 was a polyurethane having a lower hardness than the polyamide.

It is contemplated that the animal chew or bone 10 may be formed with a void near the center of the second material (core) to provide a hollow and lighter weight chew by forming the second material using a gas-assist molding process as known in the art.

It is noted that in the above example, reference was made to half body portions, which may be understood as two portions of a body, which are may be defined by two portions of relatively equal dimensions, such as equal in volume, such as displaced cubic centimeters. However, in the broad context of the present disclosure, the two body portions may not be limited to two equal volumes, and may have dissimilar volumes.

Figure 2:
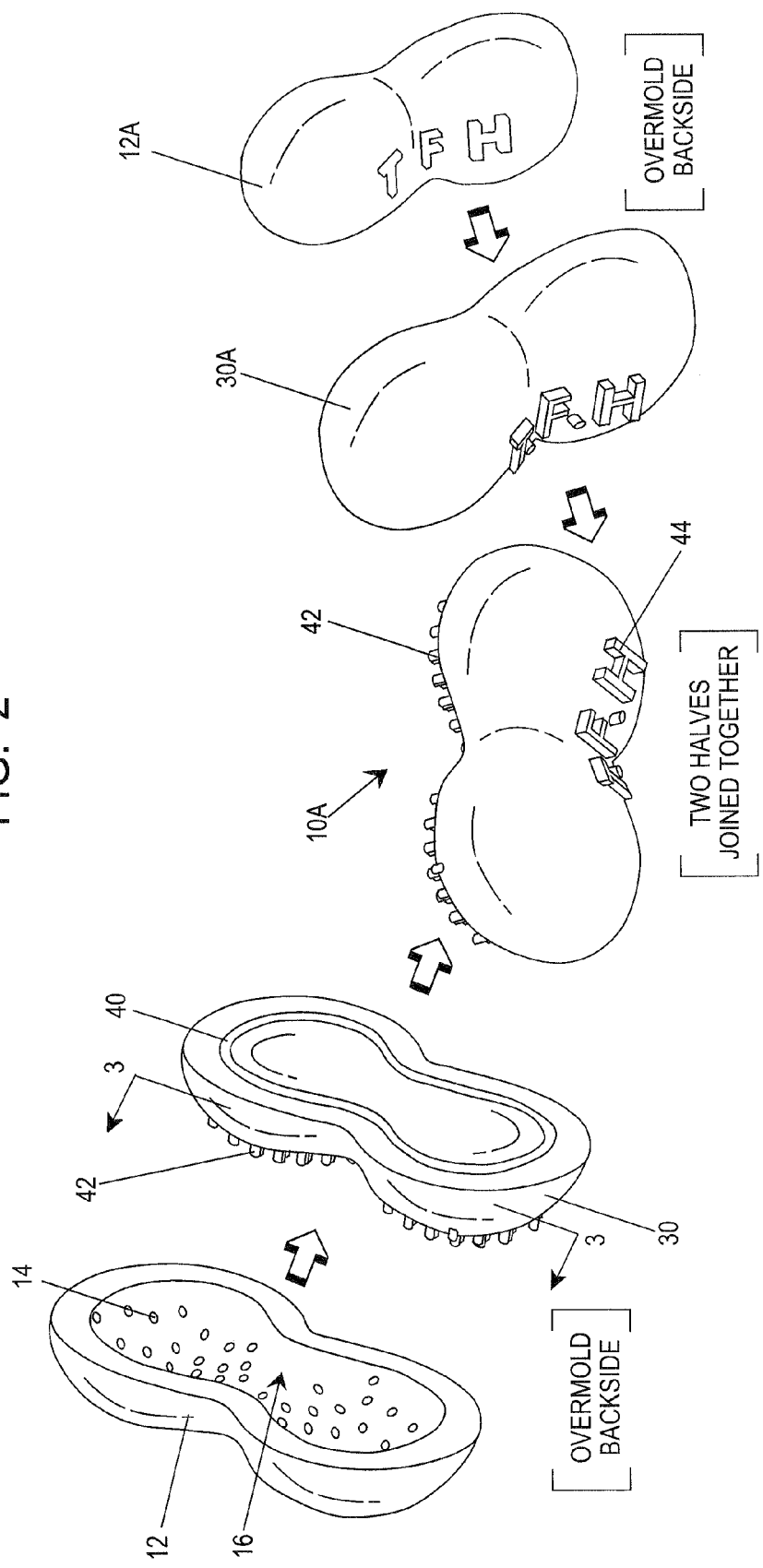
FIG. 2 is a process flow schematic illustrating another method for forming the animal chew of the present invention.

Another exemplary process for forming an animal chew or bone 10A is shown in FIG. 2. The steps for this embodiment may include:

a) molding two half body portions 12,12A of a first material having at least one concave surface 16 and one or more through holes 14, (see Block 100 in FIG. 7);

b) placing each of the half body portions into a second mold and over-molding the concave surface 16 with a layer of a second material 40, to form intermediate two-layered half portions 30, 30A, the second material forming areas of exposed regions of the second material, as for instance protrusions 42 and/or indicia 44 by filling the one or more through holes 14, (see Block 200 in FIG. 7); and c) attaching the two intermediate half portions together such that the concave surfaces 16 face one another to form a hollow animal chew 10A (see Block 300 in FIG. 7).

Figure 3:
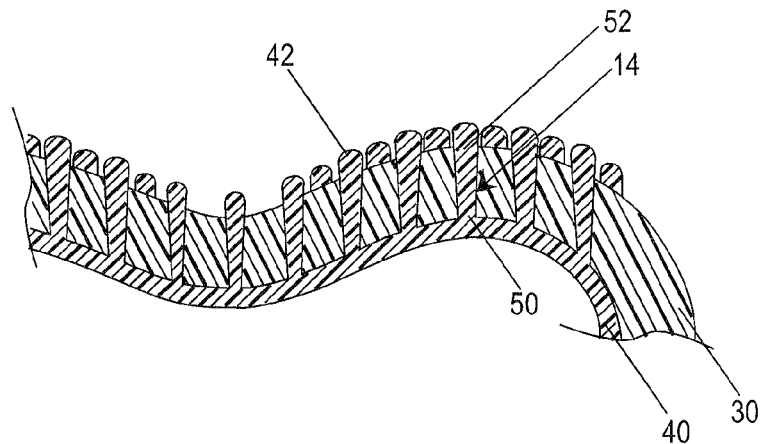
FIG. 3 is an enlarged cross-sectional view of the animal chew of FIG. 2 taken along lines 3-3.

FIG. 3 is an enlarged cross-sectional view taken along lines 3-3 of FIG. 2, illustrating the tapered holes 14 that may be formed through the half body portion 30 (or 12, 12A) in this view filled with the second material and forming protrusions 42. While the holes need not be tapered, FIG. 3 illustrates how tapered holes may aid in the retention of the second material 40 in the over-molded half portion 30, as the cross-sectional dimension 50 of the hole at the inside of the half portion is less than the cross-sectional dimension 52 of the hole at some point above the inside of the half portion, in this case at the outside wall.

Figure 4:
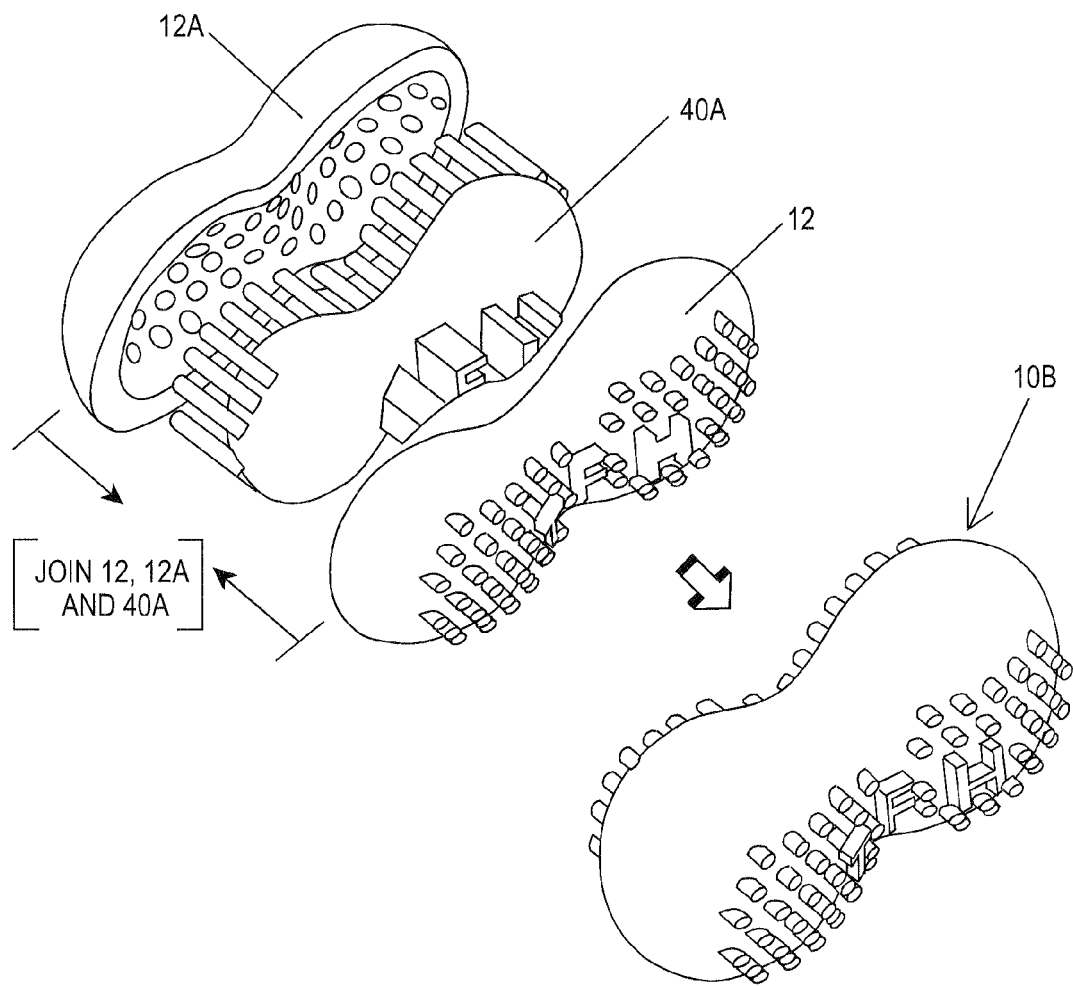
FIG. 4 is a process flow schematic illustrating a still another method for forming the animal chew of the present invention.

FIG. 4 illustrates another exemplary process for forming an animal chew or bone 10B. The steps for such exemplary process may include:

a) molding two half body portions 12,12A of a first material having at least one concave surface 16 and one or more through holes 14, (see Block 100 in FIG. 8);

b) molding a separate center configuration 40A of a second material having dimensions that complement the concave portions 16 of the two half body portions 12, 12A and holes 14, (see Block 200 in FIG. 8);

c) attaching the two half portions 12, 12A together such that the concave surfaces 16 engage the complementary surfaces of the separate configuration 40A to form an animal chew, (see Block 300 in FIG. 8).

In this exemplary embodiment, it is contemplated that the holes 14 may not be tapered as shown in FIG. 3 to ease the assembly process. Also, in this process, it may be possible to use a center configuration of a thermosetting material, such as rubber, which may have processing or curing conditions that may be degrade the first material. Finally, an adhesive may be used to attach the three portions together. In addition, reference to the feature that the second material has dimensions that complement the concave portions of the two half body portions, may be understood as that situation where the surface of 40A may contact at least 90% or more of the concave surface of body portion 12 and 12A.

Figure 5:
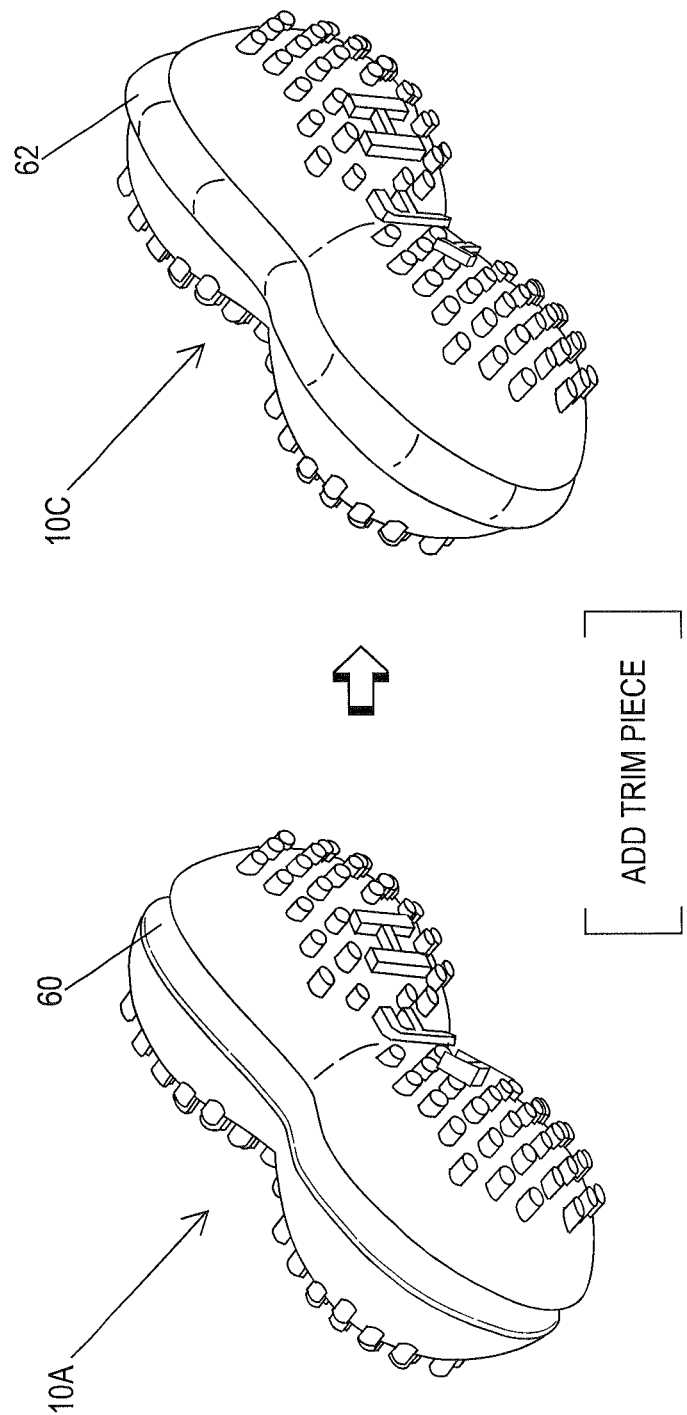
FIG. 5 is a process flow schematic illustrating a trim strip applied to the animal chew of the present invention.

FIG. 5 illustrates animal chew or bone 10C having a depression at the joint line 60 where the two half body portions are joined. This joint line may be filled by a trim piece 62 of the second or a third material. The trim piece 62 may be adhered to the chew 10A, 10B, 10C, or mechanically attached or assembled by any of the plastic joining methods disclosed herein. The trim piece may be decorated with a different color, texture, logo or indicia. The trim piece may act to hold the two half portions 12, 12A and 30, 30A together or provide a different chewing experience for the animal by having one or more properties that are different from the first or second materials.

To expand on the above, the first and second materials may include thermoplastic or thermosetting materials, including rubber materials and thermoplastic elastomers. For example, the materials may include polyurethane, nylon, nylon copolymers, styrene-butadiene copolymers, polyether-amide copolymers, silicone, polycarbonate, polycarbonate copolymers, natural rubber, etc. It should be appreciated that the first and second materials may be of the same family, wherein, specific properties of the material, such as the hardness, color or light transmitting capacity of the material may be altered to differentiate the first from the second material.

In addition, the first and/or second material may also include an edible resin composition. Edible resin compositions may include any starch or carbohydrate of natural or vegetable origin. The starch may include amylose and/or amylopectin and may be extracted from plants, including but not limited to potatoes, rice, tapioca, corn and cereals such as rye, wheat, and oats. The starch may also be extracted from fruits, nuts and rhizomes, or arrowroot, guar gum, locust bean, arracacha, buckwheat, banana, barley, cassaya, konjac, kudzu, oca, sago, sorghum, sweet potato, taro, yams, fava beans, lentils and peas. The starch may be present in the edible resin composition between about 30-99% including all increments and values therebetween such as levels above about 50%, 85%, etc.

The starch employed herein may be raw starch, which may be understood as starch that has not seen a prior thermal molding history, such as extrusion or other type of melt processing step where the resin is shaped in the presence of heat. The raw starch itself may also be native, which may be understood as unmodified starch recovered in the original form by extraction and not physically or chemically modified. The raw starch may also be in powder form of varying particle size, which may be in the range of about 1-2000 µm, including all ranges and increments therein. Raw starch may be understood as milled and/or pre-sifted starch. It should be understood that the raw starch may also have varying degrees of moisture present. In one embodiment moisture may be present in the raw starch between 1-60%, including all increments and values therebetween such as 40%, 20%, 10%, etc.

The edible resin compositions herein may be sourced from Manildra Group USA, under the following tradenames: "GEMSTAR 100" which is a refined food grade wheat starch; "GEMSTAR100+" which is a refined food grade wheat starch; "GEM OF THE WEST VITAL WHEAT GLUTEN" which is a powder product by low temperature drying of gluten extracted from wheat flour; "ORGANIC GEM OF THE WEST VITAL WHEAT GLUTEN" which is a powder product by low temperature drying of gluten extracted from organic wheat flour; "ORGANIC GEMSTAR 100" which is a wheat starch extracted from organic what flour; and/or "ORGANIC GEMGEL 100" which is a pregelatinized organic wheat starch In addition, the resin composition may be sourced from ADM under the tradename "EDIGEL 100" which is a wheat resin composition; "AYTEX P" which is a unmodified food grade wheat starch.

Other edible resin materials may be contemplated that may be derived from animal sources such as casein, denatured or hydrolyzed casein, collagen, denatured or hydrolyzed collagen, rawhide, gelatin, other animal protein products, such as animal meal. The resin material may also be derived from plant matter such as gluten, vegetable matter, nuts, such as nut flour, paste or bits, fruit matter, etc. It should also be appreciated that the various edible resin materials, (i.e. starch, animal derived sources, and plant derived sources) may be blended with other edible resin compositions, thermoplastic materials, and/or thermoset materials.

For example, glutens may be incorporated into the edible resin composition. Gluten may be understood as water-insoluble protein complex extracted from cereal grains such as maize or corn and wheat. The gluten may be present individually or cumulatively between about 0.1-50% by weight of the resin composition and all increments and values therebetween including 0.1-5.0%, 15%, 25%, etc.

In addition various additives may be incorporated into the edible resin compositions. For example, the edible resin compositions may include cellulose. The cellulose may be, for example, a long-chain polymer of polysaccharide carbohydrate. The cellulose may also be derived or extracted from plants. The cellulose may be incorporated into the resin composition between about 1-15% by weight of the resin composition and any increment or value therebetween including 4%, 10%, 11%, etc.

Emulsifiers or surfactants may also be incorporated into the edible resin compositions. The emulsifier may be present between about 1-10% by weight of the resin composition and all increments or values therebetween including 3%, 4%, etc. The emulsifier may include, for example, lecithin, which may be extracted or derived from, for example, egg yolk or soy beans.

The edible resin compositions may also include a plasticizer. The plasticizer may include for example, glycerin. The plasticizer may be incorporated between about 15-30%, including all increments and values therebetween such as levels greater than 15%, 21%, 27% etc.

A humectant may also be incorporated into the edible resin composition. The humectant may include, for example, oat fiber. The humectant may be incorporated between about 0.1-5% by weight of the resin composition including all intervals and values therebetween, including 1%, 25%, etc. A humectant may be understood to be any additive that may absorb water in the material.

The edible resin composition may also include water. The water may be introduced into the composition between about 1-40% by weight of the edible resin compositions and any increment or value therebetween, including 4%, 20-40%, 10-20%, etc. After the product has been formed, the water may be present between 1-20% by weight of the resin composition including all increments or values therebetween, such as, below 20%, 4%, 5-10%, etc.

The first and/or second materials (i.e. the edible resin compositions, thermoplastic and/or thermoset resins) may generally include a nutraceutical. The nutraceutical may be fermented soya. Fermented soya nutraceuticals are available from Bio Food, Ltd., Pine Brook, N.J. and sold under the general trademark Soynatto®. The fermented soya is present between about 1-40% by weight of the resin composition, including all increments and values therebetween, including 10%, 20%, etc.

The first and/or second materials may also include enzymes and/or co-enzymes which are similarly available through Bio Foods, Ltd., Pine Brook, N.J. and sold under the trademark of BT-CoQ10®. This reportedly is a biologically transformed (fermented) cell mitochondrial coenzyme and contains Coenzyme Q10, antioxidants, phytonutrients and cofactor mineral nutrients and other cell constituents. The enzymes and/or co-enzymes may be present between 0.1-10% by weight of the resin composition, including all increments and values therebetween such as 1%, 5%, etc.

In addition, herbal extracts, vitamins, minerals, colorants, yeast products, soy products, attractants, etc., may also be incorporated into the first and second material. Yeast products, for example, may include nutritional yeast or brewers yeast such as saccharomyces cerevisiae, dairy yeast such as kluyveromyce marxianus or wine yeast such as saccharomyces fermentati. It should be appreciated that, the first material may be provided with a first colorant, attractant, yeast product, etc. and that the second material may be provided with a second colorant, attractant, etc.

In an exemplary embodiment, the first (body portion) material may have a first hardness, flexural modulus or tensile strength, for instance, which is different from the corresponding values for the second material which is located in the exposed regions. For example, the body portion may have a Shore A durometer of greater than 70, including all values and increments therein up to 100, e.g. 80, 90, etc. The second material forming the core and exposed regions may have a Shore A durometer of less than 100, including all values and increments therein to about 20, e.g. 50, 70, etc. In addition, the flexural modulus of the body portion may have a value of greater than 100,000 psi, and the flexural modulus of the exposed regions may have a flexural modulus of less than 100,000 psi. The tensile strength of the first material may be about or greater than 10,000 psi, and the tensile strength of the second material may be less than about 10,000 psi.

Along such lines, it may be appreciated that the body portion may therefore provide suitable rigidity such that the pet chew would not sag or be unacceptable for a pet chew toy application. In addition, the selection of materials for the body and exposed regions may be controlled such that there is sufficient bonding at the interface of the two materials, and the materials do not provide a phase separation boundary at such location. Accordingly, the material of the body may be selected to be compatible with the material of the exposed regions, meaning that the materials will not generally phase separate along their boundary line.

In order to optimize the bonding of the body portion with the exposed regions, the materials may also be selected so that during molding, the surface of the body (first material) may melt a sufficient amount in the presence of the exposed (second) material so that the materials tend to melt bond. To achieve such a result, the melting or softening temperature of the surface of the body material may be controlled to be within about +/−10 degree C. of the melting or flow temperature of the second material.

With respect to the compatibility requirement, the body portion material may therefore be selected from a first material so that it may have a Hildebrand solubility parameter $\delta_1$ that is within +/−5 units $(cal/cm^3)^{1/2}$ of the solubility parameter value $\delta_2$ of the exposed (second) material including all values and increments therein, such as with in +/−1-2 units, +/−0.25-1 units, etc. Within such limits it is contemplated that the compatibility between the surfaces of the first material forming the body portion and the second material forming the core may be controlled to acceptable levels.

Surface treatment of the body portion material is another option which may similarly provide for suitable bonding of the exposed (second) material. For example, the body material may be first prepared and the surface may be treated with a suitable adhesive resin (e.g., a pressure sensitive adhesive or a hot melt adhesive such as poly(ethylene-co-vinylacetate). In an exemplary embodiment, the adhesive may be coated onto the concave surfaces and in the holes in the body material, by methods such as spray coating, dip coating, powder coating, etc. In another embodiment, the adhesive may be injection molded onto the body portion material. In addition, the surface of the body material may be exposed to plasma treatment or corona discharge to improve bonding. It may also be possible to provide the exposed (second) material with an adhesive component or functionality which may promote adhesion between the second material and the body material. It should also be appreciated that the second material may likewise be treated with an adhesive and/or the body may be provided with an adhesive component or functionality.

As alluded to above, the body material and/or the exposed (second) material (thermoplastic, thermoset or edible material) may be luminescent and may include a luminescent additive. Luminescence may be understood as light generated by, for example, chemical or biological change, subatomic motion, crystalline reaction, or stimulation of an atomic system. The luminescent chews may be, for example, fluorescent or phosphorescent.

Fluorescence may be understood as a process in which a high-energy photon may be absorbed and re-emitted as a lower-energy photon having a different or longer wavelength. The re-emission of the photons may occur on the order of a few seconds to a few minutes, including all ranges and increments therein, e.g. 0.01 seconds to 10 minutes. Exemplary fluorescent colorants may be based on aromatic structures such as xanthenes, rhodamines, aminonaphthalimides, perinones, and thioindigos based colorants.

Phosphorescence may be understood as a process in which energy stored in a substance is released very slowly and continuously in the form of glowing light. The release of energy stored in phosphorescent materials may be over a relatively long period of time, from a few seconds to a few hours, including up to 24 hours. Exemplary phosphorescent materials may include zinc sulfide crystals with copper and/or manganese activator; calcium and strontium sulfide activated with bismuth; crystalline structures of metal oxide aluminates, containing one or more of strontium, calcium, magnesium, barium and activated by europium and at least one or more co-activators including ytterbium, dysprosium, neodymium, samarium, thorium, thulium, erbium, etc.

The luminescent additive may be added to the body portion material in the range of about 0.1% to 50% by weight, including all values and increments therein. The average particle size may be between 0.1-100 microns including all increments and values therein. The luminescent additive may also be spherical or acicular in shape.

The body portion material and/or the exposed (second) material may be made of a relatively clear polymeric material. For example, the second material may include a material that is capable of transmitting about or greater than 50% of visible light, including all values therein. The second material may also be capable of transmitting greater than 50% of UV radiation, including all values therein. Transmittance may be understood as the ratio of light transmitted through the material to the incident light. The body material may also have a haze of less than 50%, including all values therein. Haze may be understood as the amount of light scattered from within or from the surface of a specimen. Accordingly, the luminescent core may be at least partially visible through the body material.

The body portion material and/or exposed (second) material may also include a texture, which may be understood herein as regular or irregular features, such as protrusions or depressions, located on the surface or near surface of the body. The texture may be incorporated on only a portion of the chew or may be incorporated over the entire chew surface. Furthermore, the texture may vary across the surface of the chew. It should be understood that the haze and transmittance of the body materials may be altered by the texture on the surface.

The body portion material and/or the exposed (second) material may also incorporate an attractant. The attractant may be present at a level of between about 0.1% to 10% by weight of the polymeric material, including all ranges and increments therein. The attractant may be an olfactory stimulant or a flavoring. Exemplary attractants may include the meal or by-products of fish, meat, poultry, etc. In addition, the attractants may include animal digests. By animal digest it is meant to include a substance made by taking relatively clean and relatively undecomposed animal tissue and breaking it down utilizing chemical or enzymatic hydrolysis. The animal digest may include hydrolyzed liver, e.g., hydrolyzed poultry liver. In addition, the animal digests may not contain hair, horn, teeth, hooves or feathers, which may be present in unavoidable trace amounts. The animal digests may be obtained, for example, from Applied Food Biotechnology Incorporated, O'Fallon, Mo., and sold under the trade name Optimizor®. The attractants may be provided in a number of forms such as liquid or powder. It may also be provided as a concentrate.

A coating may also be formed on the body portion to provide various visual effects or to provide the attractant. The coating may include a polymeric material which may be over molded, dip coated, etc. onto the chew. The coating may include for example, various pigments, such as pearlescent or metallic pigments to better mimic the desired body configuration. However, it should be appreciated that, like the body, the coating may be transparent.

The foregoing description is provided to illustrate and explain the present invention. However, the description hereinabove should not be considered to limit the scope of the invention set forth in the claims appended here to.

What is claimed is:

1. A method of manufacturing an animal chew comprising;
  providing a first material;
    molding said first material into the shape of two separate body portions each having a concave inner surface, and at least one of said body portions including one or more through holes;
    attaching said two body portions together such that the concave inner surfaces face one another to form a hollow body portion;
  providing a second material;
  placing said hollow body into a second mold; and
  injecting said second material into said hollow body to at least partially fill said hollow body and said one or more through holes such that a portion of said second material remains exposed through the outer surface of the first material.

2. The method of claim 1, wherein said second material is formed into a hollow shape by the injection of a fluid during or after the injection of the second material.

3. The method of claim 1, wherein two body portions are attached by mechanical, adhesive or plastic welding means.

4. The method of claim 1, wherein at least one of said through holes has a cross-sectional dimension at some location above the bottom of said hole that is greater than the cross-sectional dimension at the bottom of the hole.

5. The method of claim 1, wherein said first material comprises a polyamide and said second material comprises a polyurethane.

6. The method of claim 1, wherein said two half body portions are attached at a joint line and said joint line is covered by a trim strip.

7. A method of manufacturing an animal chew comprising;
  providing a first material;
    molding said first material into the shape of two separate body portions each having a concave inner surface, and at least one of said separate body portions including one or more through holes;
  providing a second material;
    molding said second material into a configuration having dimensions that complement the dimensions of the concave inner surfaces of the separate portions when the portions are combined and of the one or more through holes;
  attaching said two body portions together such that said concave inner surfaces face each other and surround at least a portion of the molded configuration of said second material and said molded configuration extends outwardly from said one or more through holes when the two body portions are attached.

8. The method of claim 7, wherein the two body portions are attached by mechanical, adhesive or plastic welding means.

9. The method of claim 7, wherein said first material comprises a polyamide and said second material comprises a rubber.

10. The method of claim 7, wherein said two body portions are attached at a joint line and said joint line is covered by a trim strip.

11. The method of claim 10, wherein said trim strip comprises said second material or a third material.

* * * * *